United States Patent [19]

Takahashi et al.

[11] Patent Number: 5,126,902
[45] Date of Patent: Jun. 30, 1992

[54] FLOATING TYPE MAGNETIC HEAD

[75] Inventors: Hideji Takahashi; Ryo Goto; Manabu Toyoda, all of Mooka, Japan

[73] Assignee: Hitachi Metals, Ltd., Tokyo, Japan

[21] Appl. No.: 595,415

[22] Filed: Oct. 11, 1990

[30] Foreign Application Priority Data

Jan. 31, 1990 [JP] Japan .................................. 2-21599

[51] Int. Cl.⁵ ..................... G11B 5/60; G11B 5/147; G11B 5/235; G11B 5/127
[52] U.S. Cl. ................................. 360/103; 360/126; 360/120; 360/113
[58] Field of Search ............... 360/103, 102, 104, 126, 360/120, 113

[56] References Cited

U.S. PATENT DOCUMENTS

| | | | |
|---|---|---|---|
| 3,896,495 | 7/1975 | Beecroft | 360/103 |
| 4,807,074 | 2/1989 | Kamo | 360/113 |
| 4,922,360 | 5/1990 | Takano et al. | 360/113 |
| 4,924,334 | 5/1990 | Diepers et al. | 360/103 |

Primary Examiner—John H. Wolff
Assistant Examiner—Craig A. Renner

[57] ABSTRACT

A floating type magnetic head using a magnetic core comprising a main magnetic circuit constituted with an oxide magnetic material and a thin metallic magnetic film constituting an auxiliary magnetic circuit formed at least on the side of the magnetic gap portion and having the track width of not greater than 16 μm, wherein the hard axis of magnetization for the metallic magnetic film is directed to the direction of the gap depth.

7 Claims, 9 Drawing Sheets

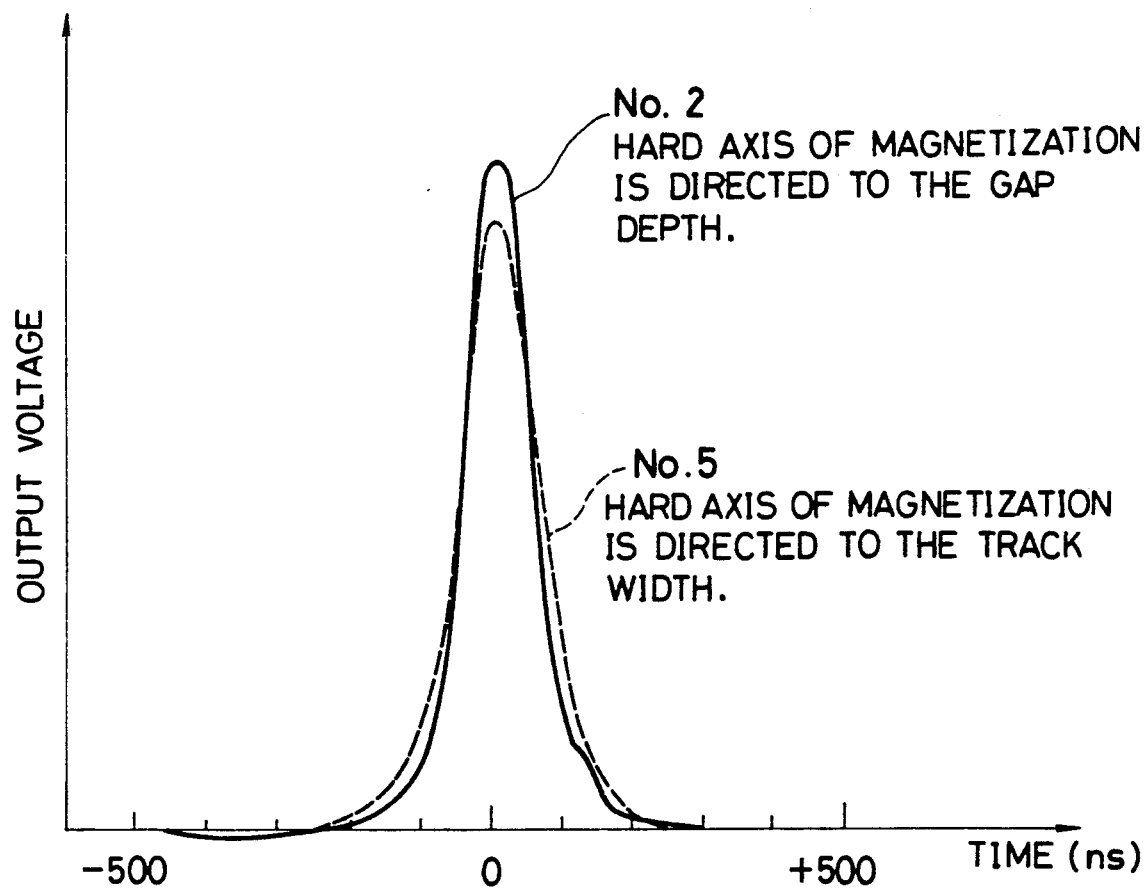

FLOATING TYPE MAGNETIC HEAD

BACKGROUND OF THE INVENTION

Field of the Invention and Related Art Statement

The present invention concerns a floating type magnetic head and, in particular, it relates to a magnetic head having a magnetic core, in which a main magnetic circuit is constituted of an oxide magnetic material and a thin metallic magnetic layer constituting an auxiliary magnetic circuit is formed at least to the side of a magnetic gap. More in particular, it relates to a floating type magnetic head improved with bit shift.

As is well-known, the floating type magnetic head is constituted such that a disk-like magnetic recording disk (medium) is rotated and slightly floated by an air stream caused by the rotation.

FIG. 1 is a schematic view of a floating type magnetic head. A magnetic head 1 comprises a non magnetic slider 2 and a chip 3. The chip 3 is inserted in a slit 6 which is formed in an air bearing surface 4 which constitutes one of a pair of air bearing surfaces 4, 5 of the slider 2 and fixed in position by being molded with glass, for example.

Detailed structure for one embodiment of the chip 3 is shown in FIGS. 2 and 3. In FIGS. 2 and 3, a thin metallic magnetic film 11 composed of a sputtered film is formed on an I-sectioned core 10 made of oxide magnetic material e.g. Mn-Zn ferrite Reference numeral 12 denotes a C-sectioned core e.g. Mn-Zn ferrite. A pair of cores 10 and 12 are joined to each other with glass while putting the metallic magnetic film 11 therebetween so as to provide a gap G. Reference numeral 13 denotes glass. Predetermined windings are wound around the core 10 through a winding wind 14. FIG. 4B is a magnetic flux distribution diagram near the gap G in the magnetic head.

As shown in FIGS. 3 and 4B, in the head formed with the metallic magnetic film 11, magnetic fluxes are concentrated in the metallic magnetic film 11 to improve the bit shift as compared with the floating type magnetic head not formed with the magnetic film as shown in FIG. 4A (it has been found that).

However, a relationship between direction of the hard or easy magnetization axis of the thin metallic magnetic film and the bit shift has not yet been considered and the hard axis of magnetization of the thin metallic magnetic film has not been put to a specific direction in a magnetic core in which a main magnetic circuit is constituted with an oxide magnetic material, and a thin metallic magnetic film constituting an auxiliary magnetic circuit is formed at least to the side of the magnetic gap.

Japanese Patent Laid Open Sho. 63-293710 proposes a floating type magnetic head having a magnetic core prepared by vapor depositing an Fe-Al-Si type magnetic film on the surface of a substrate, in which the easy axis of magnetization of the Fe-Al-Si series magnetic film is directed substantially perpendicular to the direction of the main magnetic path. In the paper, it is described that the magnetic permeability of the metallic magnetic film is increased even if the film thickness of the metallic magnetic film is small by directing the easy axis of magnetization perpendicular to the main magnetic path. Since the main magnetic path in the paper means a magnetic flux flowing in a short circuiting manner through the gap G as shown in FIG. 5, the easy axis of magnetization aligns with the direction along the film surface of the metallic magnetic film 11 (for example, the direction of the gap depth).

Further, Japanese Patent Laid Open Sho. 62-229511 describes that the hard axis of magnetization is directed in the direction of the gap depth in a magnetic induction type thin-film magnetic head. However, the thin-film magnetic head has magnetic path constituted of only thin metallic film and, naturally, the function thereof is apparently different from that in a case of forming an auxiliary magnetic path of the metallic magnetic film. That is, in the thin-film magnetic head, as shown in FIG. 6, the metallic magnetic films 17 and 18 per se constitute a main magnetic path and the magnetic fluxes emitted from the gap form a shape of sharp loops concentrated into the magnetic metallic film. On the contrary, in a floating type magnetic head as in the present invention having a magnetic core, in which a main magnetic circuit is constituted of an oxide magnetic material and a thin metallic magnetic layer constituting an auxiliary magnetic path is formed at least on the side of a magnetic gap, the magnetic fluxes emitted from the gap form broad loops distributing to oxide cores due to magnetic flux emitted from the core, and the function of the metallic magnetic film is different from that in the thin-film magnetic head.

OBJECT AND THE SUMMARY OF THE INVENTION

An object of the present invention is to provide a floating type magnetic head having high writing/reading characteristics and excellent bit shift characteristics.

The floating type magnetic head according to the present invention uses a magnetic core in which a main magnetic path is constituted with an oxide magnetic material, a thin metallic magnetic film constituting an auxiliary magnetic path is formed at least at the side of a magnetic gap and the track width is less than 16 μm (micrometer), wherein the hard axis of magnetization of the metallic magnetic film is directed along with the direction of the gap depth.

In the present invention, the angle between the hard axis of magnetization and the direction of the gap depth is preferably less than 30°.

As the oxide magnetic material for the core in the present invention, Mn-Zn ferrite of multi-crystals or single crystal is preferred. A preferred composition, consists essentially of from 26 to 32 mol % of MnO, 14 to 21 mol % of ZnO, and the balance of $Fe_2O_3$.

As the metallic magnetic film, Fe-Al-Si type magnetic film referred to as sendust is preferred. As the Fe-Al-Si type magnetic film, a composition consisting essentially of, on weight bases, from 2 to 10% Al, from 3 to 16% Si and the substantial balance of Fe is preferred and, particularly, those consisting essentially of from 4 to 8% of Al, from 6 to 11% of Si and the substantial balance of Fe are more preferred. Further, it is suitable to contain Ti and Ru each by less than 2% for improving the corrosion resistance and abrasion resistance. Further, similar effect can also be obtained by containing less than 4% of Cr.

The Fe-Al-Si type magnetic film is formed on the surface of an oxide magnetic material substrate by means of a vapor phase deposition such as sputtering so as to provide monoaxial anisotropy. For providing the monoaxial anisotropy, there may be employed, for example, a method of:

(1) sputtering while applying a magnetic field on the surface of a substrate or (2) forming a magnetic field on the surface of the substrate by utilizing leakage magnetic field from magnetron sputtering.

The methods of (1) and (2) may be used in combination or, further, other method capable of providing substantially monoaxial anisotropy can also be used.

BRIEF DESCRIPTION OF THE DRAWINGS

FIGS. 9, 10A, 10B, 11 and 12 are graphs illustrating the result of the measurement.

DESCRIPTION OF THE PREFERRED EMBODIMENTS

The present invention will now be described more in details while referring to examples and comparative examples.

Figure 1:
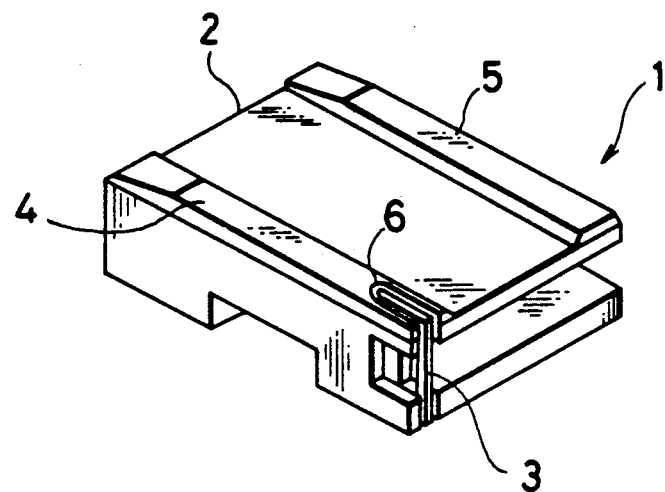
FIG. 1 is a perspective view of a floating type magnetic head.
Figure 2:
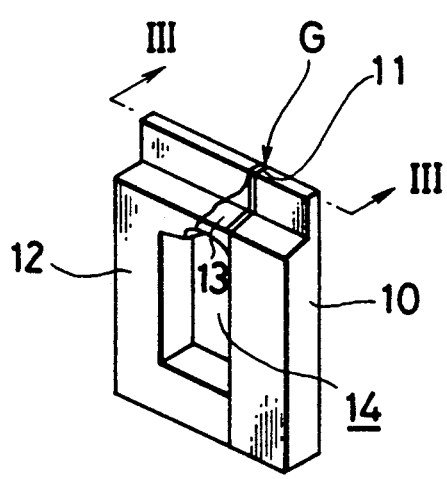
FIG. 2 is a perspective view of a magnetic head chip.
Figure 3:
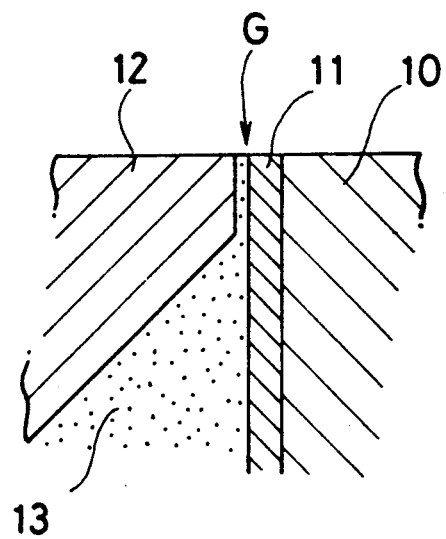
FIG. 3 is a cross-sectional view of the gap taken along lines III—III in FIG. 2.
Figure 4A:
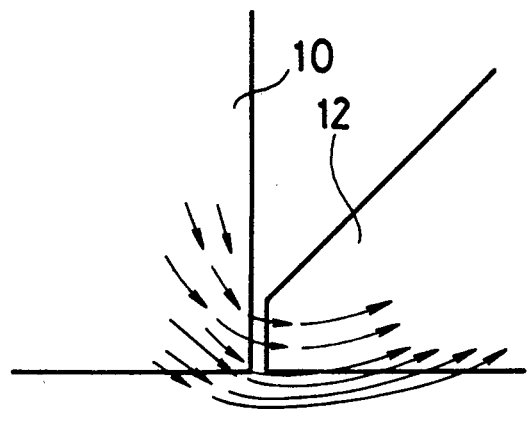
FIGS. 4A, 4B, and FIGS. 5 and 6 are explanatory views for the gap.
Figure 4B:
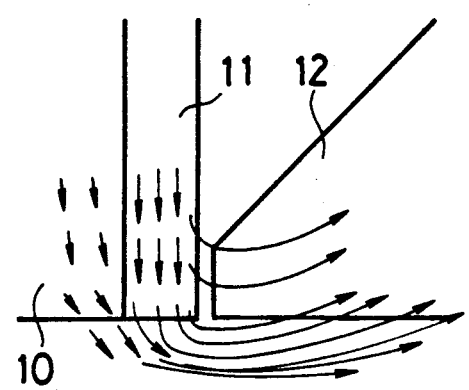
Figure 5:
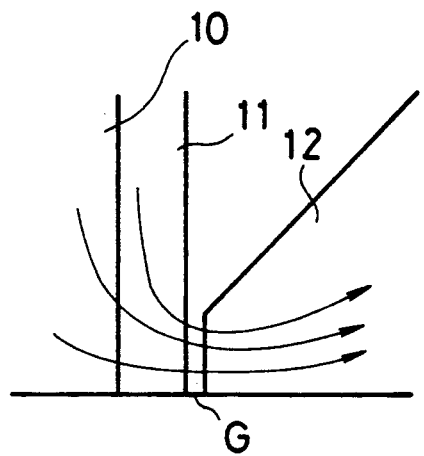
Figure 6:
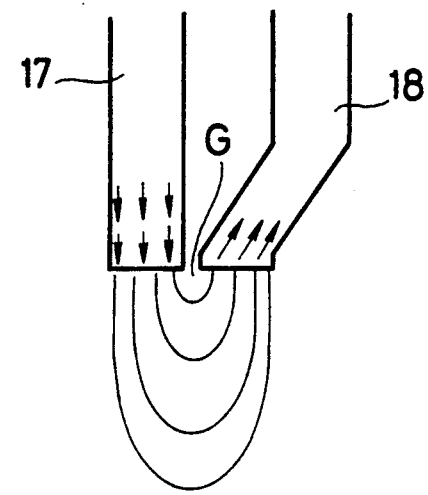
Figure 7:
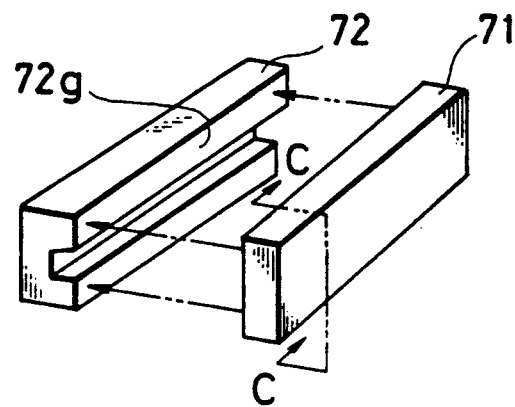
FIG. 7 is a perspective view illustrating the method of manufacturing the core.

An alloy target of 76 mm in diameter and 2 mm in thickness and containing Fe, Al and Si was used in magnetron sputtering method in accordance with the following sputtering conditions to form an Fe-Al-Si type magnetic film on a flat Mn-Zn ferrite substrate 71 (2.5 mm width, 25.5 mm length and 1 mm thickness) as shown in FIG. 7.

A magnetic field was applied in the longitudinal direction of the substrate by utilizing the leakage magnetic field from the magnetron target.

| RF power | 350 W |
| Target-substrate distance | 70 mm |
| Substrate temperature | 300° C. |
| Vacuum degree attained | $5 \times 10^{-4}$ Pa |
| Gas pressure | $7 \times 10^{-1}$ Pa | the thicknesses of the formed thin metallic magnetic films are as shown below.

Figure 8A:
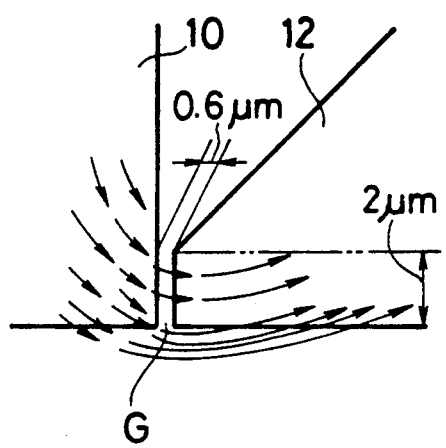
FIGS. 8A, 8B, 8C and 8D are magnetic flux distribution diagrams around head gaps.
Figure 8B:
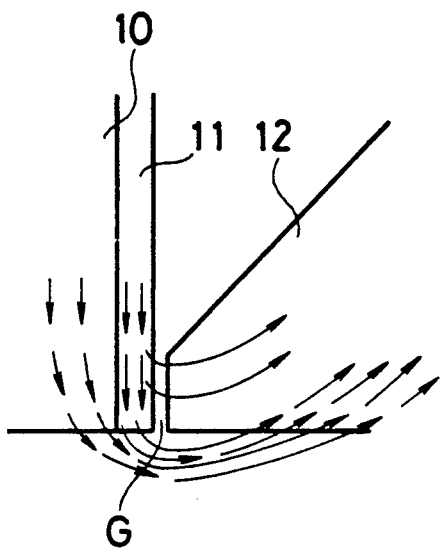
Figure 8C:
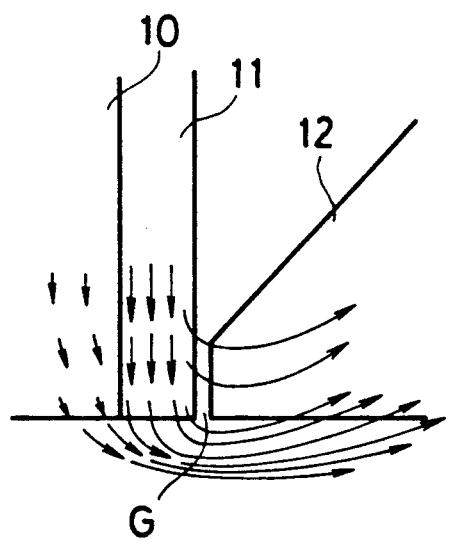
Figure 8D:
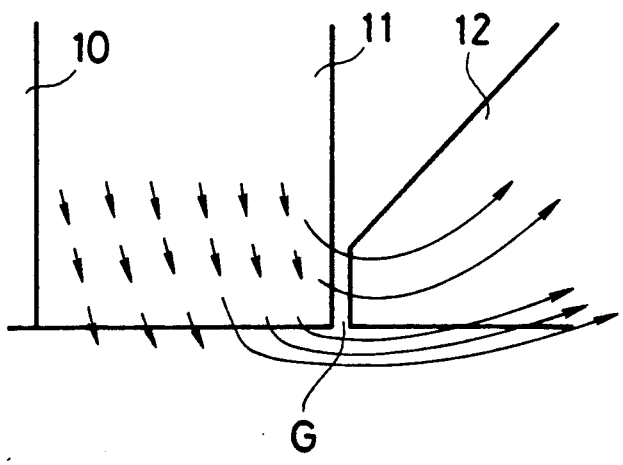

| No. | Thickness (Micrometer) | Note | Drawings corresponded |
|---|---|---|---|
| 1 | 0 μm | Comparative Example | FIG. 8A |
| 2 | 1 μm | Example | FIG. 8B |
| 3 | 2 μm | Example | FIG. 8C |
| 4 | 8 μm | | FIG. 8D |

Then, $SiO_2$ was sputtered to a thickness of 0.6 μm to a portion 72 g to be formed with a gap of a Mn-Zn ferrite substrate 72 of a concaved cross section. Subsequently, the substrates 71 and 72 were bonded to each other by means of glass ($PbO-SiO_2-Al_2O_3-B_2O_3-BaO-Na_2O$ type) at 700° C. Then, the bonded body was cut along the direction of line C-C in FIG. 7 and applied with lapping to manufacture a magnetic core with 11 μm of track width. After applying windings by 56 turns, the core was mounted to a non-magnetic slider and the opposing surface of the medium was fabricated to manufacture magnetic heads as shown in FIGS. 8A-8D. The heads had a gap depth of 2 μm and the gap length of 0.6 μm.

The Mn-Zn ferrite had a composition comprising 30 mol % of MnO, 15.5 mol % of Zn and 54.5 mol % of $Fe_2O_3$. The metallic magnetic film had a composition comprising 85 wt % of Fe, 6 wt % of Al and 9 wt % of Si.

The thin metallic magnetic film had the following properties.

| $B_{10}$ | 10500 G |
| Hc | 0.32 Oe |
| Permeability along easy magnetization axis (5 MHz) | 720 |
| Permeability along hard magnetization axis (5 MHz) | 2530 |

In the heads Nos. 2, 3 and 4, the hard axis of magnetization aligns with the direction of the gap depth (vertical direction in FIGS. 8B-8D).

Another comparative magnetic head was prepared like the head No. 2 except that the direction of the magnetic field applied upon forming the Fe-Al-Si type metallic magnetic film was in perpendicular to the above to prepare the magnetic head having the hard axis of magnetization in perpendicular to the surface of the thin metallic magnetic film. The thus prepared comparative magnetic head was used as No. 5 specimen. In the heads No. 5, hard axis of magnetization aligns with the direction of the track width.

(1) Evaluation for the magnetic head characteristics by finite factor method.

The characteristics of the magnetic head were at first evaluated by the finite factor method.

FIGS. 8A-8D show the distribution of the magnetic fluxes near the gap when setting the magnetic generating force as a 80 mA.

It can be seen from FIGS. 8A-8D that if the thickness of the metallic magnetic film is about 1 or 2 μm, magnetic fluxes are concentrated to the metallic magnetic film 11 and the vicinity thereof on the side of the I-shaped core 10 and that the magnetic fluxes are just or about in perpendicular to the medium opposing surface at the medium opposing surface of the I-shaped core. It can also be seen that the magnetic fluxes are moderately curved in a arcuate shape for the No. 1 head having no metallic magnetic film or the head in which the metallic magnetic film is made remarkably thick (8 μm). As a result of various simulations, it has been found that preferred film thickness is about from 0.3 to 3 μm. Since the magnetic permeability of the sendust film is lowered as the film thickness is reduced, the film thickness of about 1 to 2.5 μm is particularly suitable.

(2) Comparison of the output voltage between No. 2 and No. 5

The output characteristics for the No. 2 and No. 5 magnetic heads were measured by using a 3.5 inch sputtered magnetic recording medium with coercive force Hc at 950 Oe. The results are shown in FIG. 9. FIG. 9 is a self read/ write wave form of 0.5 MHz independent wave read from the medium.

As can be seen from FIG. 9, in No. 2 in which the hard axis of magnetization aligns with the gap depth, the head shows a greater peak power and with smaller peak width as compared with those in No. 5 in which the hard axis of magnetization aligns with the direction of the track width.

The medium had a measuring radius of 22.9 mm, number of rotation of 3,600 r.p.m. flying height of 0.19 μm and track width of 11 μm.

(3) Output voltage upon write/read separation

Write/read separation was conducted to the medium as described in (2) above and output voltage was measured. The measurement was conducted with combining the No. 1 head having no metallic magnetic film and No. 2 head according to the present invention having the metallic magnetic film in the following four combinations. LF=1.25 MHz and HF=3.33 MHz.

|   | Write      | Read       |
|---|------------|------------|
| a | No. 2 head | No. 2 head |
| b | No. 2 head | No. 1 head |
| c | No. 1 head | No. 2 head |
| d | No. 1 head | No. 1 head |

Figure 10A:
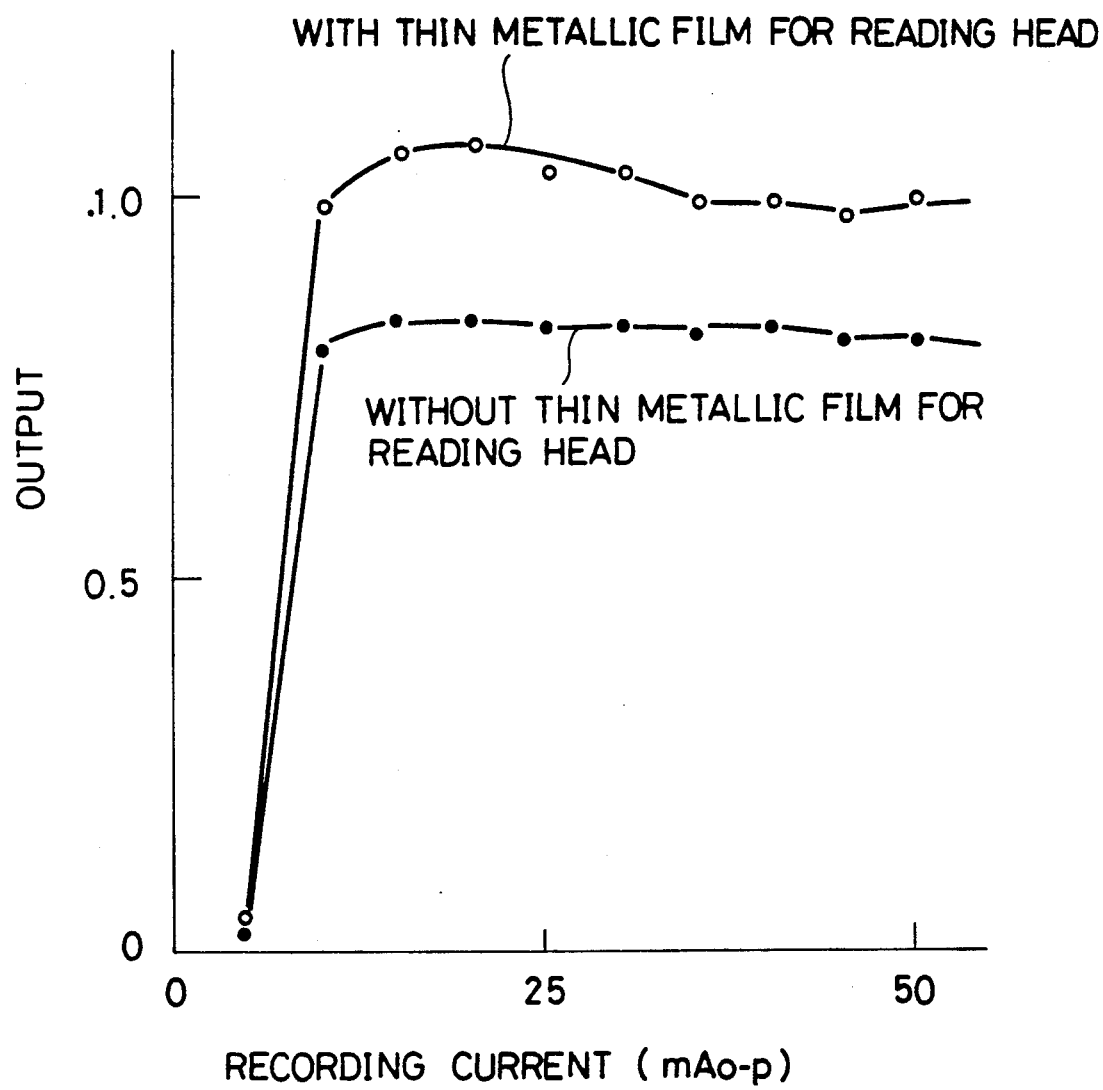
Figure 10B:
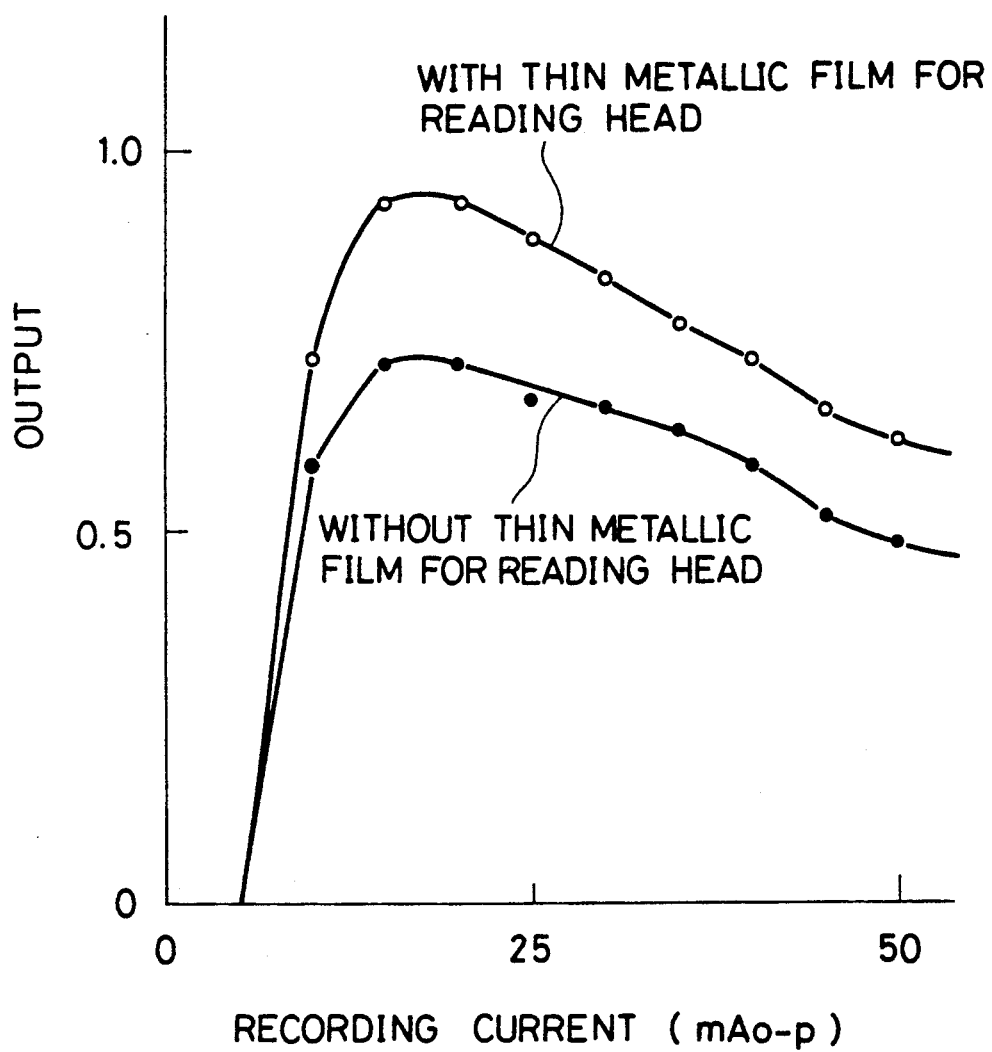

The results are shown in FIGS. 10A and 10B, in which FIG. 10A shows a case of recording by a head with a metallic film and FIG. 10B shows a case of recording by a head without such metallic film.

As can be seen from FIGS. 10A and 10B, the reading output is greater in the case of using the No. 2 head on reading when either No. 1 or No. 2 head was used on writing. Further, as shown in FIG. 10B, if No. 1 head was used on writing, the reading output is reduced along with the increase of the recording current in a region where the recording current is greater than about 15 mA if either No. 1 or No. 2 head was used on reading. It is considered to be attributable to that if the recording current is greater than 15 mA in the No. 1 head having no metallic magnetic film, the distribution of the magnetic fluxes was further expanded in an arcuate form than that shown in FIG. 8.

(4) Measurement for correlationship between the hard axis of magnetization and the output or the bit shift For the recording medium as described above, output and bit shift were measured using the No. 1 magnetic head. The output and the bit shift were measured also for the magnetic head having the similar structure with that of the No. 2 magnetic head but the hard axis of magnetization was slanted relative to the direction of the gap depth and the No. 5 magnetic head in which the hard axis of magnetization was in perpendicular to that direction. The window width was set to 40 nanosecond.

Figure 11:
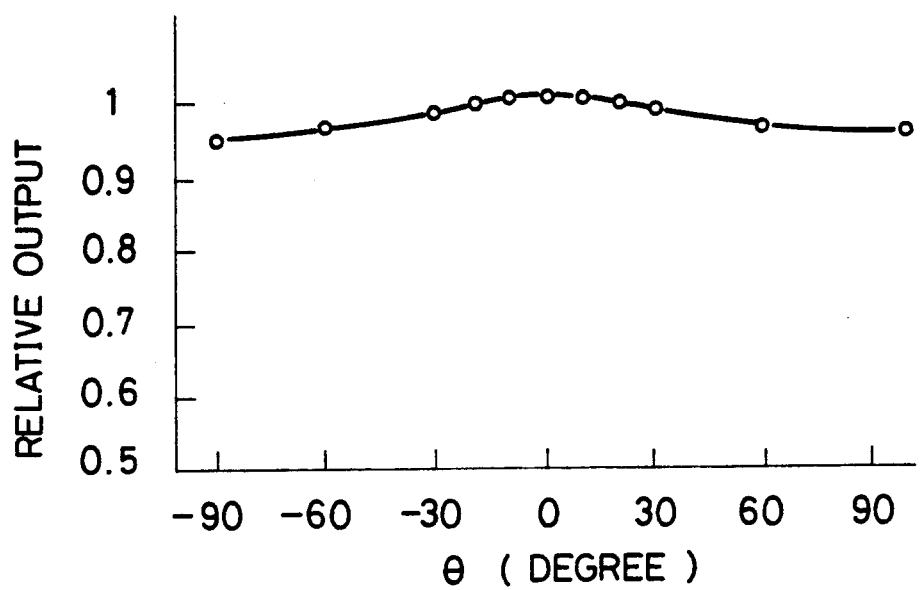
Figure 12:
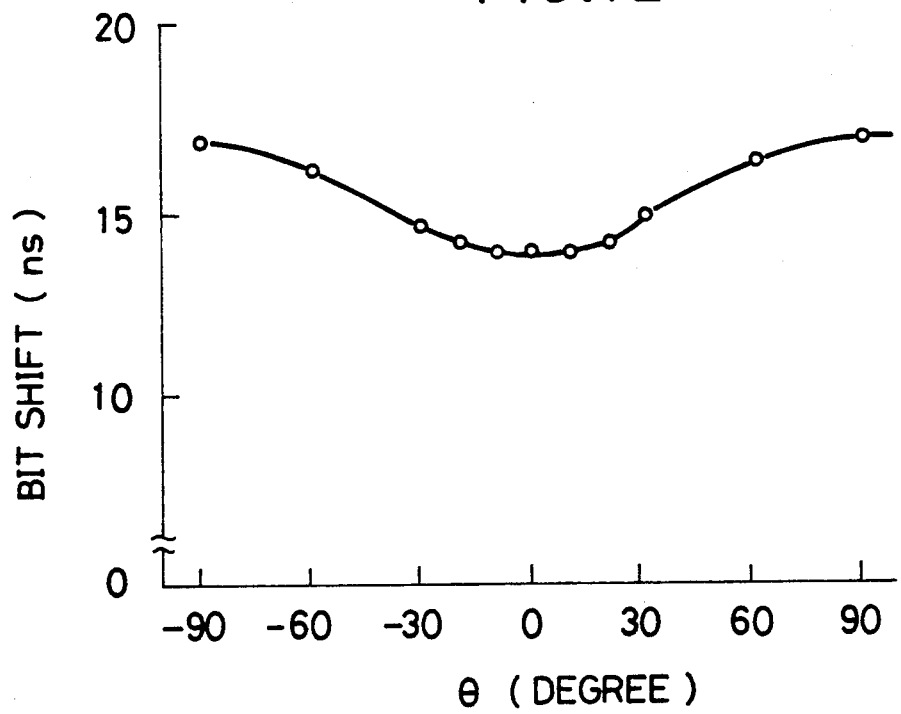

The results are shown in FIGS. 11 and 12. It can be seen from FIGS. 11 and 12 that the relative output is greater and the bit shift is lower when the hard axis of magnetization is within a range of ±30° relative to the direction of the gap depth.

Figure 13:
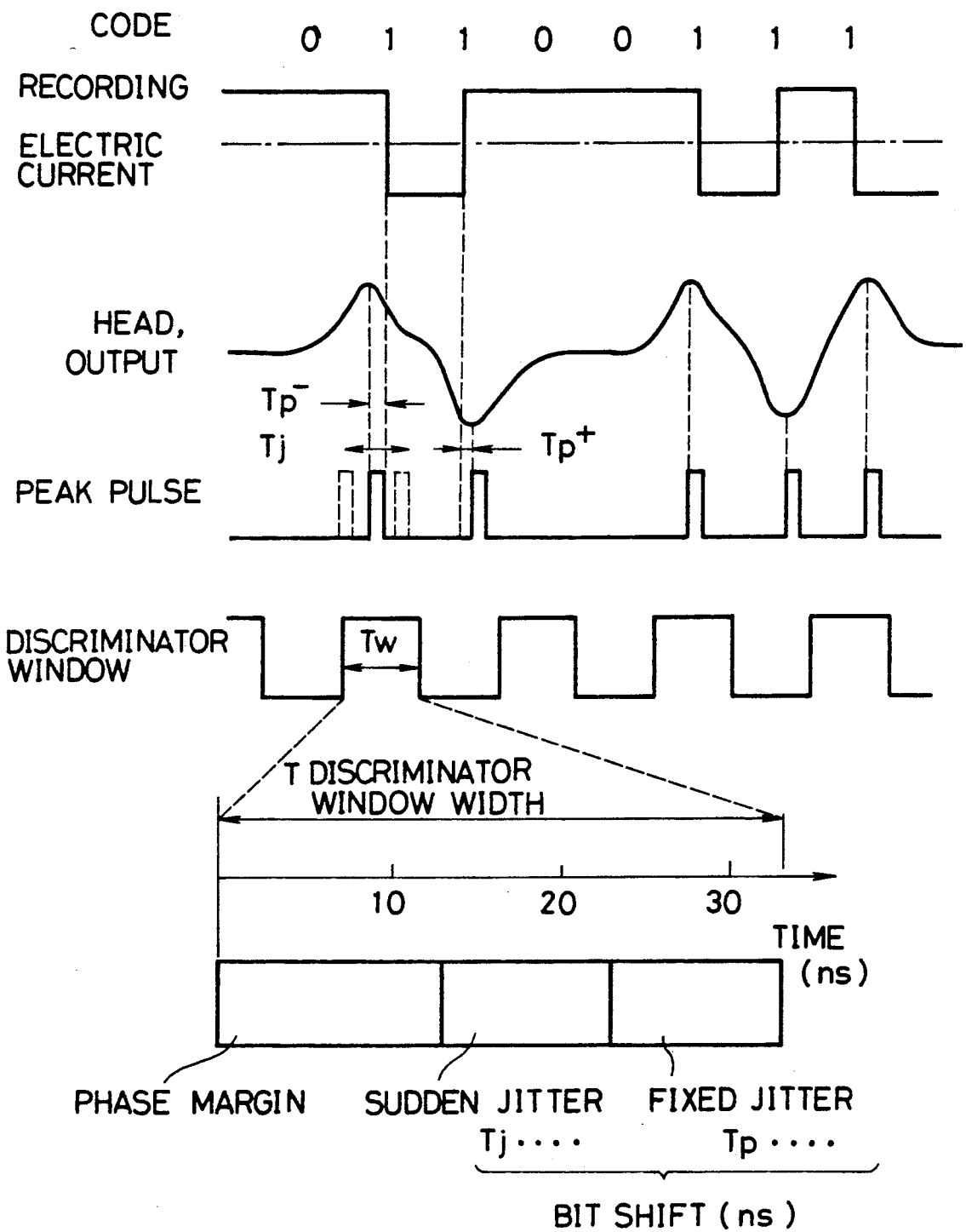
FIG. 13 is an explanatory view of the bit shift.

FIG. 13 is an explanatory view for a bit shift. In this example, bit shift was measured with the worst pattern in which a series of codes occur successively as 01100111.

Figure 14:
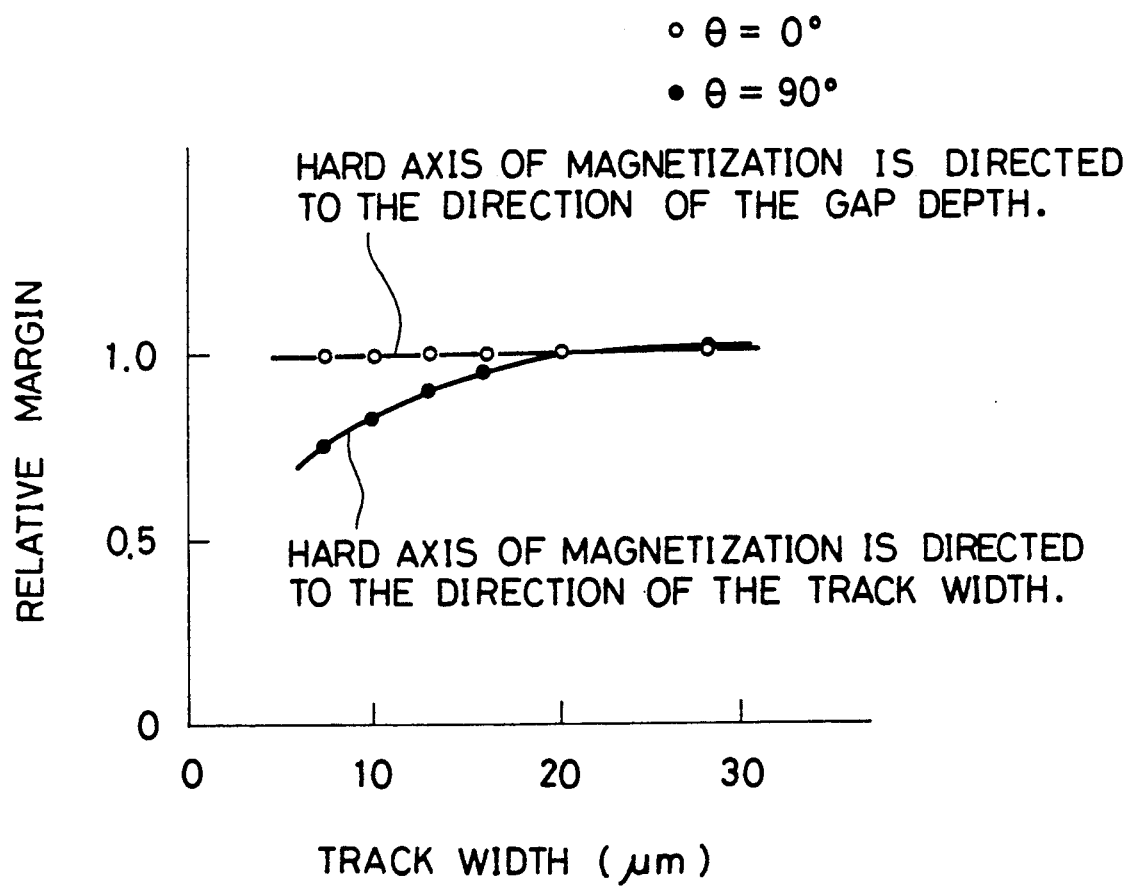
FIG. 14 is a graph showing relative margin vs. track width.

(5) Measurement for correlationship between the relative margin and the track width Relative margin was measured by using No. 2 and No. 5 magnetic heads. A magnetic head having the same structure as that in No. 2 and No. 5 but different from them only with respect to the track width was prepared and a relative margin was measured. The results are shown in FIG. 14. In FIG. 14, the relative margin is assumed as 1.0 at angle of hard magnetization axis to gap depth $\theta=0°$. It can be seen from FIG. 14 that the relative margin is reduced (bit shift is not improved) in the No. 5 or its analogous magnetic heads in which the hard axis of magnetization is directed to the direction of the track width, particularly, where the track width is less than 20 μm, particularly, less than 16 μm. Accordingly, the present invention is particularly effective for the magnetic head with the track width of less than 16 μm.

What is claimed is:

1. A floating type magnetic head comprising a slider having an air bearing surface and a head core secured to the slider, the head core having:
   a main magnetic circuit with a track width of less than 16 μm, comprising an oxide magnetic material and having a magnetic gap portion, and
   an auxiliary magnetic circuit made of a thin metallic magnetic film formed on the side of the magnetic gap portion of at least of said main magnetic circuit;
   hard axis of magnetization of the metallic magnetic film being directed in the direction of the gap depth.

2. A floating type magnetic head as defined in claim 1, wherein the angle made between the hard axis of magnetization and the direction along the gap depth is less than 30°.

3. A magnetic head as defined in claim 2, wherein the oxide magnetic material is Mn-Zn ferrite.

4. A magnetic head as defined in claim 3, wherein the Mn-Zn ferrite has a composition comprising;

| MnO | 26 to 32 mol % |
| ZnO | 14 to 21 mol %, and |
| $Fe_2O_3$ | balance. |

5. A magnetic head as defined in claim 2, wherein the thin metallic magnetic film comprises Fe-Al-Si type alloy film.

6. A magnetic head as defined in claim 5, wherein the Fe-Al-Si type alloy has a composition comprising;

| Al | 4 to 8 wt % |
| Si | 3 to 16 wt %, and |
| Fe | balance. |

7. A magnetic head as defined in claim 6, wherein the Fe-Al-Si type alloy, further, comprises one or more of less than 2 wt % of Ti, less than 2 wt % of Ru, less than 4 wt % of Cr.

* * * * *